No. 877,486. PATENTED JAN. 28, 1908.
J. R. BROWN.
CASTER.
APPLICATION FILED MAR. 30, 1906.
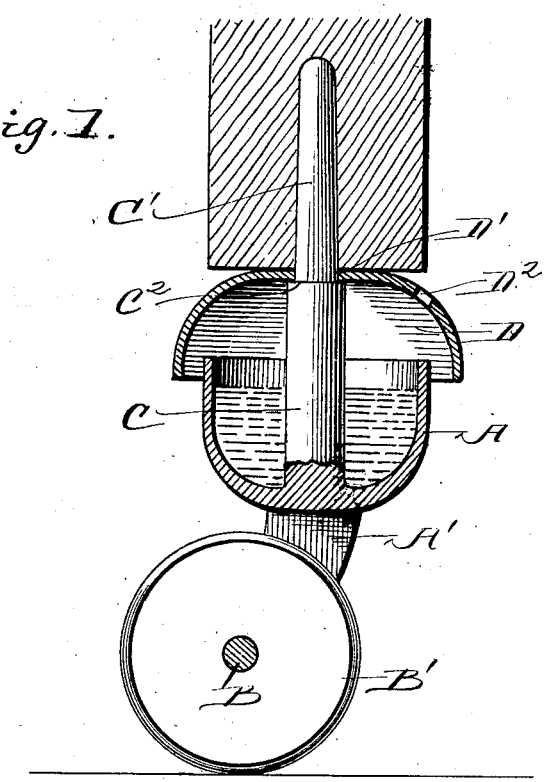
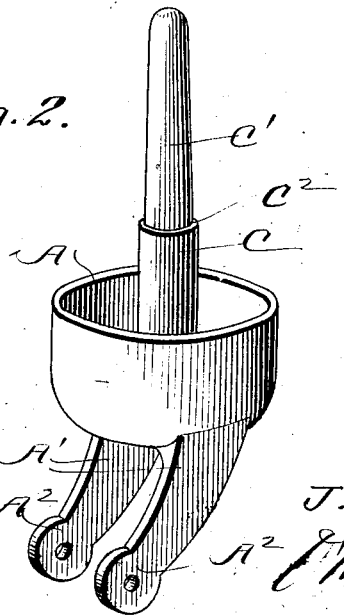
WITNESSES:
INVENTOR
J. R. Brown
BY
ATTORNEYS

UNITED STATES PATENT OFFICE.

JAMES R. BROWN, OF MOULTRIE, GEORGIA.

CASTER.

No. 877,486.

Specification of Letters Patent.

Patented Jan. 28, 1908.

Application filed March 30, 1906. Serial No. 308,927.

*To all whom it may concern:*

Be it known that I, JAMES R. BROWN, a citizen of the United States, residing at Moultrie, in the county of Colquitt and State of Georgia, have invented a new and useful Improvement in Casters, of which the following is a specification.

This invention relates to casters and more particularly to insect guards for casters; the object being to provide a caster so constructed that it is impossible for an insect to pass over the same, and up the leg of the bed or table.

Another object of my invention is to provide a caster which is surrounded by a receptacle adapted to be filled with liquid so that the insect will be caught in the liquid if it attempts to pass up the same.

With these objects in view, the invention consists of the novel features of construction, combination and arrangement of parts, hereinafter fully described and pointed out in the claims.

In the drawings forming a part of this specification:—Figure 1 is a vertical sectional view of my improved caster showing it attached to the leg of the table or bed. Fig. 2 is a perspective view of the lower part of the caster detached, and the wheel removed.

In the drawings A, indicates a round receptacle provided with downwardly projecting spaced legs A', having apertured lower ends $A^2$, in which an axle B, is mounted carrying a wheel B'. A spindle C, projects up centrally from the receptacle provided with a reduced end C', forming a shoulder $C^2$. A cup shaped cap D, of a larger diameter than the receptacle A, having a central opening D', is mounted on the shoulder $C^2$, of the spindle C, and is adapted to extend down over the receptacle A, and prevent dust and dirt from getting into the liquid adapted to be placed in the receptacle, through an opening $D^2$, formed in the cup.

The reduced end C', of the spindle C, is adapted to be secured in the recess of the leg of the bed or table, as the case may be, and securely hold the cup in place, on the shoulder.

From the foregoing description it can be readily seen that I have provided a caster which is very simple and cheap in construction and one which is very effective in use.

Having thus fully described my invention, what I claim as new and desire to secure by Letters Patent is:—

A caster of the kind described, comprising an open-top receptacle having integral legs, an axle mounted in apertures in the legs and carrying a wheel, a spindle integral with and projecting upward centrally from the receptacle, said spindle having a reduced portion forming a shoulder, and a centrally-apertured cup-shaped cap having a filling opening arranged on the spindle, said cap being of a diameter greater than that of the receptacle and extending down over the receptacle.

JAMES R. BROWN.

Witnesses:
J. D. GANDY,
G. W. HOOKER.